United States Patent
Aepli (10) Patent No.: US 10,489,743 B2
(45) Date of Patent: Nov. 26, 2019

(54) SYSTEMS AND METHODS FOR DETERMINING SHELF OCCUPANCY

(71) Applicant: Walmart Apollo, LLC, Bentonville, AR (US)

(72) Inventor: Jason Aepli, Alexandria, VA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/823,950

(22) Filed: Nov. 28, 2017

(65) Prior Publication Data

US 2018/0189722 A1 Jul. 5, 2018

Related U.S. Application Data

(60) Provisional application No. 62/432,867, filed on Dec. 12, 2016.

(51) Int. Cl.
| | |
|---|---|
| *G06Q 10/08* | (2012.01) |
| *G01L 1/14* | (2006.01) |
| *G01G 19/64* | (2006.01) |
| *G01G 3/12* | (2006.01) |
| *G01B 11/00* | (2006.01) |

(Continued)

(52) U.S. Cl.
CPC ......... *G06Q 10/087* (2013.01); *G01B 11/002* (2013.01); *G01G 3/12* (2013.01); *G01G 19/4144* (2013.01); *G01G 19/64* (2013.01); *G01L 1/14* (2013.01); *G01L 1/146* (2013.01); *G01L 1/26* (2013.01)

(58) Field of Classification Search
USPC .......................................................... 705/28
See application file for complete search history.

(56) References Cited

U.S. PATENT DOCUMENTS

| 5,671,362 A | 9/1997 | Cowe et al. |
| 6,043,736 A | 3/2000 | Sawahata et al. |
| 6,259,965 B1 | 7/2001 | Steele et al. |

(Continued)

FOREIGN PATENT DOCUMENTS

| CN | 203263127 U | 11/2013 |
| CN | 105631636 A | 6/2016 |
| JP | H11193111 A | 7/1999 |

OTHER PUBLICATIONS

International Search Report and Written Opinion for PCT Application No. PCT/US17/63374, dated Nov. 28, 2017.

(Continued)

*Primary Examiner* — Garcia Ade
(74) *Attorney, Agent, or Firm* — Schmeiser, Olsen & Watts LLP; Timothy P. Collins (57) ABSTRACT

A system for determining an amount of shelf space comprises: a plurality of weight sensors at a region of a shelf that directly measure a force related to a weight of physical items positioned on the shelf and generates a weight result, the shelf positioned at an angle from a horizontal axis; the shelf positioning the physical items at the angle; a shelf angle determination device that determines the angle of the shelf; wherein the weight sensors generates the weight result adjusted for the determined shelf angle; and an occupancy determination processor that determines an amount of surface area of the shelf occupied by the physical items from the adjusted weight result.

20 Claims, 4 Drawing Sheets

(51) Int. Cl.
   *G01L 1/26*     (2006.01)
   *G01G 19/414*   (2006.01)

(56) References Cited

U.S. PATENT DOCUMENTS

| | | |
|---|---|---|
| 6,456,067 B1 | 9/2002 | Ward |
| 8,676,377 B2 | 3/2014 | Siegel et al. |
| 8,941,495 B2 | 1/2015 | Wiese et al. |
| 9,349,113 B2 * | 5/2016 | Bashkin .............. G06Q 10/087 |
| 9,360,383 B2 | 6/2016 | Coleman et al. |
| 2005/0086133 A1 | 4/2005 | Scherer et al. |
| 2005/0171854 A1 | 8/2005 | Lyon |
| 2005/0190072 A1 | 9/2005 | Brown et al. |
| 2007/0069867 A1 | 3/2007 | Fleisch et al. |
| 2009/0114041 A1 | 5/2009 | Harish et al. |
| 2009/0319399 A1 | 12/2009 | Resta et al. |
| 2013/0182904 A1 | 7/2013 | Zhang et al. |
| 2013/0226649 A1 | 8/2013 | Grissom |
| 2015/0041616 A1 | 2/2015 | Gentile et al. |
| 2015/0127224 A1 | 5/2015 | Tabe |
| 2016/0048798 A1 * | 2/2016 | Meyer ................. G06Q 10/087 705/28 |

OTHER PUBLICATIONS

International Preliminary Report on Patentability in PCT/US2017/063374 dated Jun. 27, 2019; 9 pages.

* cited by examiner

SYSTEMS AND METHODS FOR DETERMINING SHELF OCCUPANCY

CROSS-REFERENCE TO RELATED APPLICATIONS

This application claims the benefit and priority of U.S. Patent Application No. 62/432,867, entitled SYSTEMS AND METHODS FOR DETERMINING SHELF OCCUPANCY, filed on Dec. 12, 2016, the contents of which are hereby incorporated by reference.

TECHNICAL FIELD

The present inventive concepts relate generally to measurement systems, and more specifically, to systems and methods that include sensors for identifying an area of a shelf occupied by store items.

BACKGROUND

Optimizing or allocating shelf space typically involves a manual, or visual, inspection of the shelf. However, conventional approaches are highly prone to error, inefficient, and time consuming. In modern retail environments, shelf space is costly. Also, the manner in which items are organized on a shelf is important to many stores, and may impact inventory levels, retention costs, sales, and/or profits.

In particular, warehouses can store large numbers of stock keeping units (SKUs), for example, thousands or millions, where each SKU may be stored at a unique location. Many laborers may be employed to count the available quantity of each SKU in each location, which can result in a significant operational expense. Additionally, in fast-paced businesses where the availability of a product at a certain location in a warehouse is critical, product outages are costly and negatively impact service rates, and may require additional human resources to count the SKUs. Warehouse operators rely on a product being available in its assigned location for efficient and cost-effective retrieval of the product when it is requested, which requires a human eye to visually confirm a stored product's location, quantity, and so on at its assigned location.

SUMMARY

In one aspect, provided is a system for determining an amount of shelf space, comprising: a plurality of weight sensors at a region of a shelf that directly measure a force related to a weight of physical items positioned on the shelf and generates a weight result, the shelf positioned at an angle from a horizontal axis; the shelf positioning the physical items at the angle; a shelf angle determination device that determines the angle of the shelf, wherein the weight sensors generates the weight result adjusted for the determined shelf angle; and an occupancy determination processor that determines an amount of surface area of the shelf occupied by the physical items from the adjusted weight result.

In some embodiments, the occupancy determination processor polls all of the weight sensors to determine a percentage of occupancy of the shelf.

In some embodiments, the processor polls the weight sensors for slot weight.

In some embodiments, the weight sensors detect a change in capacitance caused by the weight of the physical items, and the weight sensors include a special-purpose processor that translates the detected changed in capacitance to a value indicative of the force applied to the shelf.

In some embodiments, the force is converted to a total weight value, which is compared to a maximum weight capable of being applied to the shelf.

In some embodiments, the shelf is configured to provide multiple storage spaces for the items, and a location of the items is tracked by a stock keeping unit (SKU) or other identification code associated with each item.

In some embodiments, the system further comprises a database for storing a SKU slot assignment In some embodiments, the shelf angle determination device comprises an inclinometer for measuring a downward angle of the shelf and wherein the downward angle is used for determining the percentage of occupancy of the shelf.

In some embodiments, the system further comprises an alarm generator that provides warnings and alarms for user directed inventory levels by slot.

In some embodiments, the weight sensors include a pair of capacitive plates, wherein the compression force detected by the weight sensors is measured by an accelerometer to determine the weight.

In some embodiments, the system is constructed and arranged for positioning at a warehouse, and wherein the shelf is an industrial shelf.

In some embodiments, the system further comprises at least one light sensor at the shelf; and a processor that receives a signal from the at least one light sensor and that contributes to determining the area of the shelf that is occupied with the items in response to the light sensor signal.

In some embodiments, the at least one light sensor is a photodetector product sensor.

In one aspect, provided is a method for determining an amount of shelf space, comprising measuring a force related to a weight of physical items positioned on a shelf and generating a weight result, the shelf positioned at an angle from a horizontal axis; determining the angle of the shelf; generating the weight result adjusted for the determined shelf angle; and determining an amount of surface area of the shelf occupied by the physical items from the adjusted weight result.

In some embodiments, generating the weight result comprises detecting a compression force applied to a pair of capacitive plates.

In some embodiments, the method comprises detecting a change in capacitance caused by the weight of the physical items, and translating the detected changed in capacitance to a value indicative of the force applied to the shelf.

In some embodiments, the method further comprises polling all of the weight sensors at the shelf to determine a percentage of occupancy of the shelf.

In some embodiments, the percentage of occupancy of the shelf is determined by both item weight and shelf angle.

DETAILED DESCRIPTION OF EMBODIMENTS OF THE INVENTION

Figure 1:
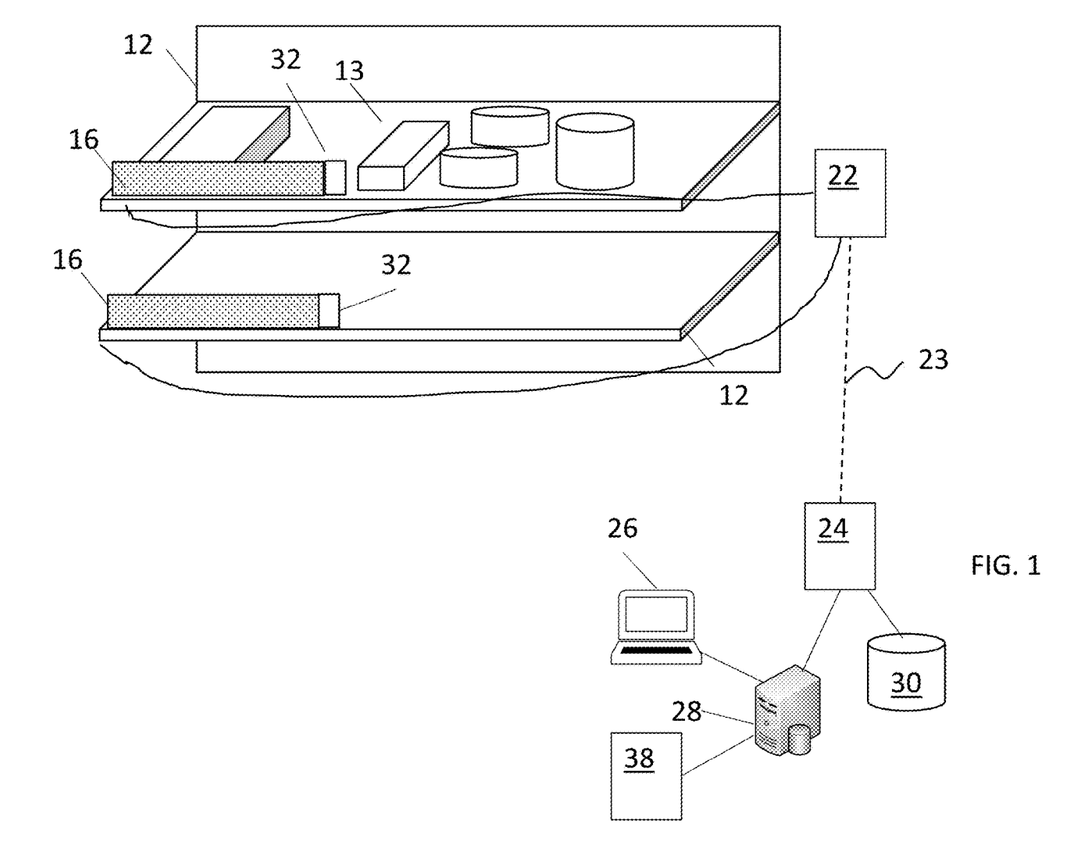
FIG. 1 is a view of an embodiment of a measurement system including weight sensors for measuring store items on a shelf.

FIG. 1 is a view of an embodiment of a measurement system including weight sensor unit 16 for measuring store items 13 on a shelf 12. The system is constructed and arranged to determine a fullness or occupancy of a shelf by a combination of a determined weight of one or more items 13 at a particular location of the shelf 12 and a determined angle of the shelf. In some examples, the shelf location is pre-assigned, so that a user or machine may identify a particular item designated for that location. For example, a weight sensor unit 16 may be positioned at a particular location identified by the aisle, bay, and slot number. Instead of occupying an entire shelf 12, the weight sensor unit 16 may be positioned at a leading edge of the shelf 12, or other region of the shelf 12. A SKU may be assigned to this location. Here, the measurement system may trigger a replenishment request for this SKU.

Figure 2:
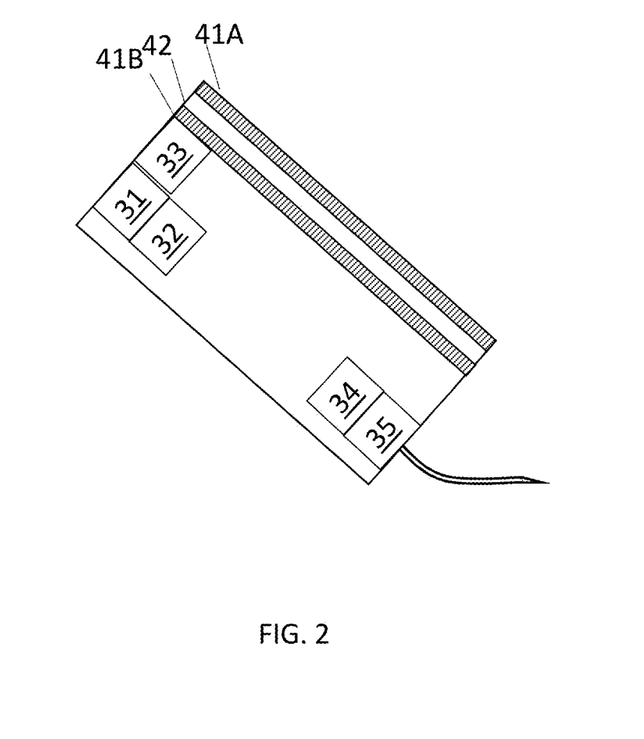
FIG. 2 is a side view of the measurement system of FIG. 1.
Figure 3:
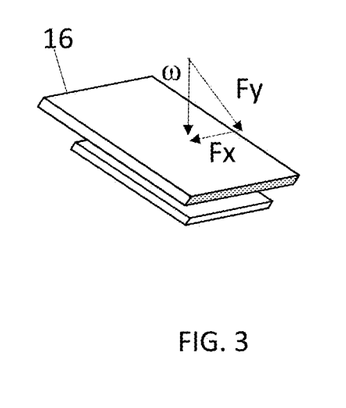
FIG. 3 is a close-up illustrative view of forces applied to a weight sensor of the measurement system of FIGS. 1 and 2.

The weight sensor unit 16 is constructed and arranged to directly measure a force formed from a weight of one or more items 13 positioned on the shelf 12, for example, by determining a change in detector capacitance described with respect to FIGS. 2 and 3. In some embodiments, the collective weight of the items 13 may range from less than 1 lb. to over 150 lbs. In other embodiments, the range of weights may depend on the angle of the shelf 12, for example, a minimum measurable total product weight of 2.5 lbs. at a 10° shelf angle, 1.5 lbs. at a 30° shelf angle, and so on. Therefore, the measurement system of FIG. 1 is preferable over conventional force and location sensing systems due to its ability to consider low weight items on an incline when determining shelf occupancy. The relationship between weight and shelf occupancy is relevant with respect to tilt angle of the shelf 12. For example, a greater tilt angle of the shelf may translate to a more accurate sensor and wider range of weights it can measure. The system recognizes that many shelves are tilted intentionally to allow gravity to draw products to the front so they are more accessible to people. The weight sensor unit 16 can detect that tilt allows the system to maintain a higher degree of accuracy. The system is agnostic to shelf design and instead requires in some embodiments angled shelves at least 10 degrees, and a physical element to support a sensor in front of the shelf, for example, a retention mechanism so that the sensor is between the retention mechanism and the product it is measuring.

The weight sensors unit 16 may be assigned locations such as slot, shelf region, or other storage location in a warehouse for storing products so that their physical location is known at all times until it is purposefully or otherwise relocated.

For example, a weight sensor unit 16 may be arranged at a particular store or warehouse location identified by aisle, bay, and slot. Since the weight sensor is assigned to this location, the sensor 16 can activate an inclinometer, accelerometer, and/or tilt sensor or the like to detect movement from the assigned location, and the detection result and the known location may be stored at a database 30.

Figure 5:
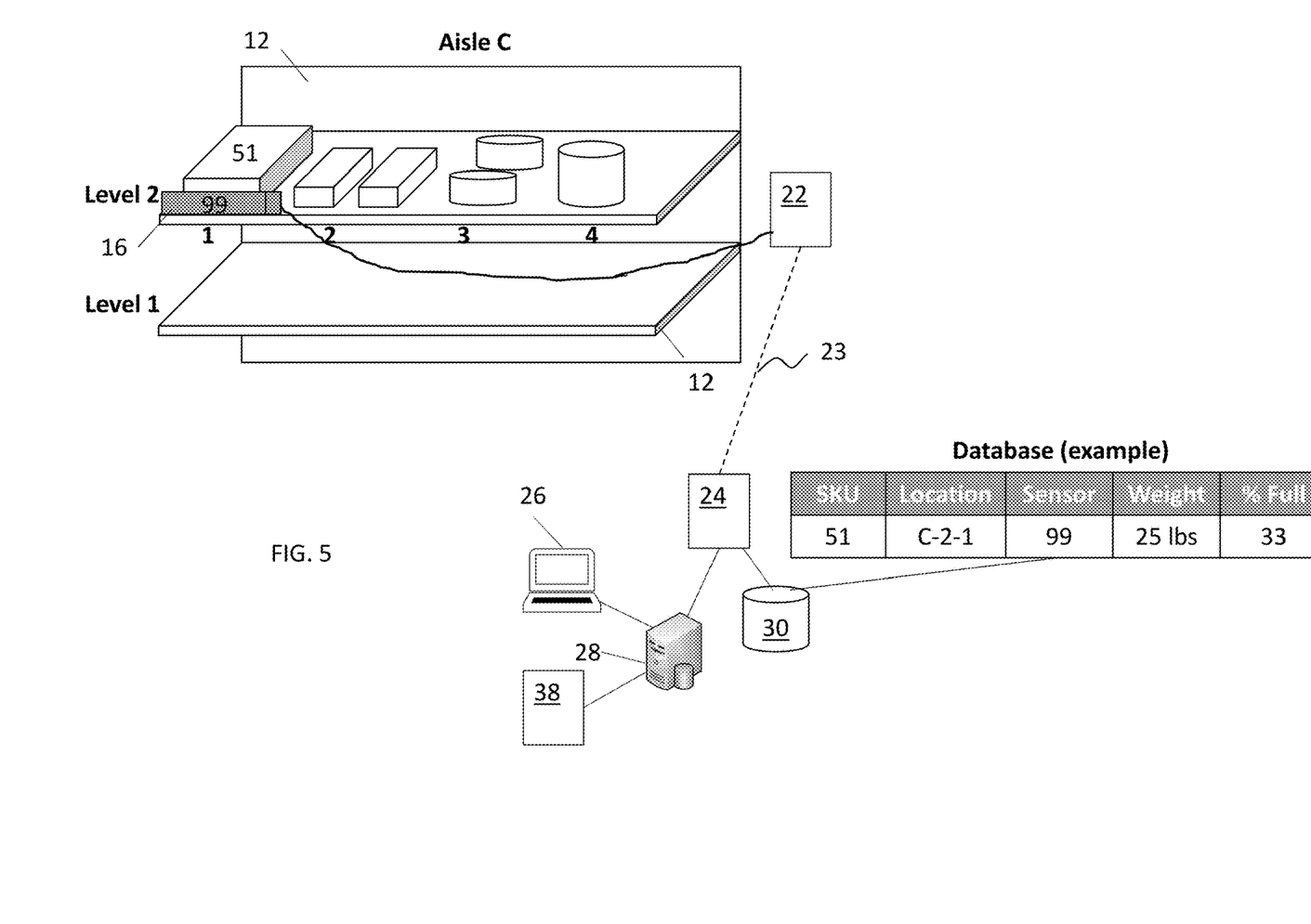
FIG. 5 is a view of an embodiment of a measurement system including a single weight sensor unit assigned an administrative location, in accordance with some embodiments.

The weight sensor unit 16 may convert the weight of a particular item 13 into slot weight data, or raw weight output compensated for shelf angle. The adjusted raw weight may be compared to the identified product is assigned to that sensor location. The system uses the known unit weight of that SKU to either display the approximate number of units in the slot or just a location occupancy percentage in cases where a slot has a known maximum unit capacity assigned in the system's database 30. Thus, in some embodiments, a single weight sensor unit 16 is required when assigned to a particular location or for determining a relative position of a load. In some embodiments, the weight sensor unit may include a single weight sensor that is assigned for a particular slot, therefore requiring less cost, complexity, and maintenance. For example, a single sensor unit 16 may be assigned a location such as a slot in a warehouse, for example, shown in FIG. 5. For example, a sensor may have a value, e.g., 99, that is included in a record for a SKU. Other details such as location, item weight, occupancy information, and so on may be part of the record. Location data may include level, for example, shelf number, region 1-4 of the identified shelf, and so on. In other embodiments, multiple weight sensor units 16 are assigned a location. The location is preferably known at all times until the sensors unit 16 are relocated. The movement of a sensor 16 from its assigned location, whether intentional or not, can be detected by the sensor's embedded tilt sensor or accelerometer (whichever is used) by the removed sensor's tilt or acceleration (due to a person moving it) exceeding a fixed threshold or threshold determined by statistical filter such as a Kalman Filter. Exceeding the threshold can generate an alert on a manager's display identifying the sensor number, its assigned location, and when the movement was detected.

A network device 22 outputs data related to a weight result determined by the weight sensor units 16. The network device 22 may include a wireless interface, wired connector, or other well-known network communications element. The network device 22 forms a data communication path 23 via a network with an access point 24 or other network communication receiver device at a remote location. The weight result is delivered to the access point 24 over the communication path 23 established between the network device 22 to the access point 24. The access point 24 in turn outputs the weight result to an occupancy determination processor 28 and/or database 30.

As previously mentioned, a weight sensor unit 16 determines a weight of one or more items 13 on a shelf 12, and generates a weight result. As shown in FIG. 2, a weight sensor unit 16 may include a pair of capacitive plates 41A, 41B (generally, 41) separated by a compressible insulator 42 formed of a dielectric material such as polyethylene foam or neoprene, but not limited thereto. Preferred materials have a roughly linear compression per force applied and functions as an electrical insulator. In some embodiments, resistive bars or the like are attached to both ends of the sensor with the insulator separating the bars from the capacitive plates. The bars may be fixed to a back plate or the like facing away from, or opposite, the plate on which the products on the shelf are positioned. An imbalance in resistance can be measured by two potentiometers or the like, which be translated to imbalanced compression of the capacitive plates, and therefore a relative position of the force applied by the product weight can be estimated.

The weight sensor unit 16 directly, distinguished from indirectly, measures a force related to a weight of an item 13, or in some embodiments measure a force due to only the product's weight via a change in detector capacitance. The weight of the item 13 causes the insulator 42 to deform between the plates 41A, 41B. The capacitance of the plates 41 is measured by a measurement circuit 33 to determine the load on the weight sensor unit 16. The measurement circuit 33 provides an output signal indicative of the load applied to the weight sensor unit 16.

Figure 4:
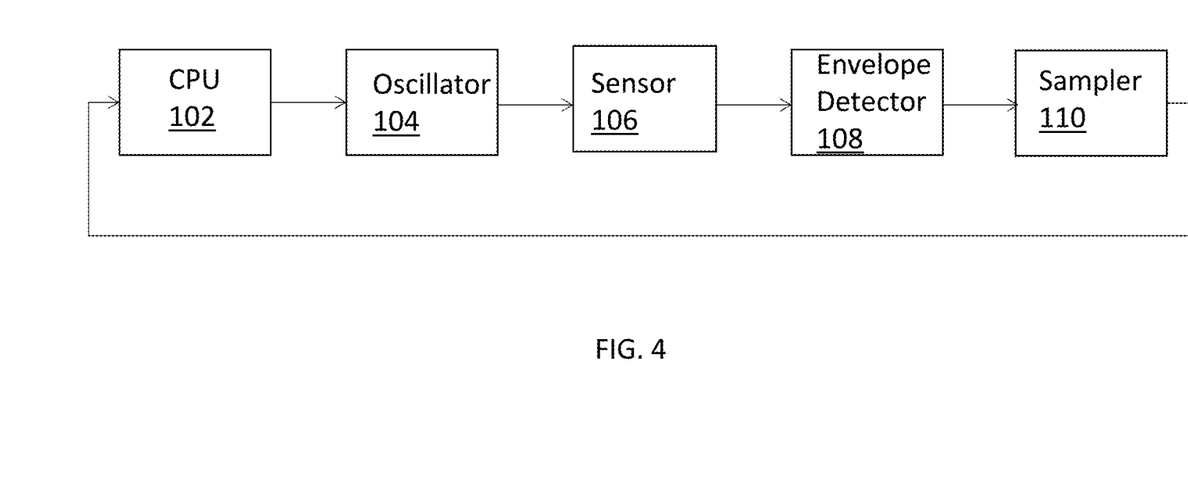
FIG. 4 is a flow diagram illustrating elements of a measuring system for determining an adjusted weight value according to a shelf angle, in accordance with some embodiments.

A measured capacitance may be converted to a value that is combined with a shelf angle determined by a shelf angle determination device 32 to establish an adjusted weight value according to the shelf angle, for example, illustrated in FIG. 4. The system in FIG. 4 for determining the adjusted weight value may include but not be limited to a processor 102 such as a central processing unit (CPU), an oscillator 104, a sensor 106, an envelope detector 108, and a sampler 110. Some or all of the processor 102 such as a central processing unit (CPU), an oscillator 104, a sensor 106, an envelope detector 108, and a sampler 110 may be part of one or more of the weight sensor unit 16, occupancy determination processor 28, third party computer, or a combination thereof, but not limited thereto. The sensor may include a capacitor (two capacitive plates with compressible dielectric material), for example, illustrated in FIG. 2.

The processor 102 receives requests to measure the product weight from an application that is connected via a network, such as the Internet, a local area (e.g., Ethernet) network, a wide area network and/or a wireless (e.g., IEEE 802.11 WiFi) network. The processor 102 activates the oscillator 104 that generates a constant frequency signal. The constant frequency electrical signal is applied to the sensor unit 16, for example, a capacitor 41, 42 shown in FIG. 2 that functions as an electrical filter 106. As weight is applied to the sensor 16, the dielectric 42 between the metal plates 41A, B compresses, thereby reducing the distance (D) between the two conductive plates 41A, B. As the distance (D) is reduced, the capacitance of the sensor 16 changes, according to Equation (Eq.) 1:

$$\text{Capacitance } (C) = \varepsilon A/d, \qquad \text{Eq. 1}$$

where $\varepsilon$ is the permittivity of the dielectric 42, A is the surface area (overlapping) of the plates 41, and d is the distance between plates, which changes when a weight is applied to the plates 41. The permittivity term $\varepsilon$ may be made up of two parts—$\varepsilon_r$ and $\varepsilon_0$, where $\varepsilon_r$ is the relative static permittivity, or dielectric constant, of the material between the plates and $\varepsilon 0$ is the electric constant (e.g., $\varepsilon 0 \approx 8.854 \times 10^{-12}$ F/m).

When the capacitance changes in this manner, the amplitude of the signal that is applied is affected according to Equation (Eq.) 2:

$$V/(\sqrt{(1+2\pi^* f^* C^* R)}), \qquad \text{Eq. 2}$$

where V=peak amplitude of applied signal from the oscillator, f=frequency of applied signal, C=capacitance, R=resistance of circuit).

Accordingly, the peak amplitude is reduced as the sensor is compressed by the product placed on the capacitor surface. The sensor 16 is connected in parallel to an envelope detector 108 that removes the oscillations in the output signal amplitude. The remaining amplitude is sampled by the sampler 110 and converted to a digital value by the processor 102. The processor 102 converts the signal amplitude (output of sampler 110) to a value corresponding to an amount of compression of the dielectric 42, for example, percentage of compression, which in turn is translated to the force applied. This is calculated by using the compression characteristics of the dielectric material 42 used. The force is converted to the total weight measured according to Equation (Eq.) 3:

$$W = F/\sin(\alpha), \qquad \text{Eq. 3}$$

where W is the measured weight, F is the force applied to the sensor, and $\alpha$ is the angle of the shelf as measured by the shelf angle determination device 32, for example, shown in FIG. 2.

In preferred embodiments, equations (Eq.) 1-3 are performed by the sensor CPU 102. Each sensor 16 sends the measured weight to the occupancy determination processor 28 and/or database 30 to be converted to either number of units in the identified slot or a percentage of fullness, or occupancy of the slot. In other embodiments, equations (Eq.) 1-3 are performed at remote computing devices, i.e., externally from the weight sensors 16.

Referring again to FIG. 2, the weight sensor unit 16 may also include one or more of a signal generator 31, communications processor 34, and electronic connector 35.

The signal generator 31 may include some or all of the processor 102, oscillator 104, filter 106, envelope detector 108, and sampler 110 of FIG. 4. The shelf angle determination device 32 provides for shelf angle compensation, or more specifically, can measure an angle of slope or tilt, elevation or depression of the shelf 12 with respect to gravity. For example, the shelf angle determination device 32 may include a sensor, for example, a camera, that detects a displacement from a vertical axis, and provide a measured voltage in linear correspondence to the angular deviation of the sensor relative to a desired orientation (i.e. relative to an axis perpendicular to the earth). In other embodiments, the shelf angle determination device 32 may include non-optical features for example that electrically measure orientation with respect to the force of gravity.

The communications processor 34 shown in FIG. 2 outputs a value corresponding to the output signal from the weight sensor unit 16 via the connector 35 to the occupancy determination processor 28 and/or database 30. The communications processor 34 can also output an incline or orientation value corresponding to the shelf angle provided by the shelf angle determination device 32. As described herein, the weight value is adjusted by the incline value at the sensor 16. In other embodiments, shelf angle/incline compensation may be performed externally from the weight sensor unit 16, for example, at the occupancy determination processor 28 in electronic communication with the weight sensor unit 16.

As described herein, the occupancy determination processor 28 may determine a fullness and/or occupancy, or otherwise data related to the amount of shelf availability for other items by receiving from a weight sensor 16 as a first input the item weight values and receiving from the shelf angle determination device 32, such as an inclinometer or related accelerometer as a second input the shelf angle data. The database 30 may store item information, such as identification codes, e.g., stock keeping units (SKUs). Accordingly, the database 30 and/or occupancy determination processor 28 may be part of a store computer, and may therefore include coexisting applications related to point of sale, etc. In addition, the database 30 may store SKU slot assignments or the like.

The occupancy determination processor 28 may poll all weight sensors 16 for slot weight data. The slot weight data may be used to determine the percentage of full slot by weight, and/or available shelf surface area and/or occupancy of the surface area, for example, according to Equation (Eq.) 4:

Occupancy Percentage (%)=[(Weight of Max No. Items Capable of Being Stored in the slot)−(Product Weight Measured)]/(Weight of Max No. of items capable of being stored in the slot)×100     Eq. 4

In some embodiments, the system includes an alarm generator 38 that provides warnings and alarms for user directed inventory levels by slot. A warehouse personnel monitor 26 may be provided for monitoring the inventory of the product in their warehouse. A user can, via an application executed by the system, click a button to poll all the sensors 16 in the warehouse at once or just a specific slot, view inventory analytics displayed in real time, and so on.

In some embodiments, a measurement system may include a plurality of photosensing devices or the like that identify regions of the shelf 12 at which the items 13 are located. Other elements of the measurement system may be similar to or the same as the measurement system illustrated and described in FIG. 1, such as occupancy determination processor 28, database 30, and alarm generator 38, but not limited thereto.

In some embodiments, the measurement system 60 may be used in addition to or instead of the weight sensor units 16 described with reference to FIGS. 1-4. For example, the weight sensor units 16 and occupancy determination processor 28 may calculate shelf fullness, more specifically, available shelf surface area and/or occupancy of the surface area, based on product weight, while the measurement system may calculate a number of boxes or other items on the shelf 12.

A photosensing device may include a plurality of light emitting diodes (LEDs), e.g., an infrared (IR) LED and photodetectors. The LEDs may emit IR radiation or the like which are reflected by the items 13 on the shelf 12. The photodetectors sense the IR radiation or the like, and outputs signals related to the received IR radiation or the like to a circuit. Information such as spacing distance between photodetectors may be stored at the database 30, or stored locally at a processor in communication with the sensors. For example, the photodetectors may be spaced apart 1 inch from each other. In this example, four neighboring photodetectors may detect the presence of an item, whereby a calculation may be performed that establishes that 1 square inch covers the detected them. Applying this logic, the photodetectors may identify the approximate size of items blocking their view. This data may be compared to information regarding known items, products, or the like, for example, via a SKU, such as dimensions of the packaging in which the items are located. Accordingly, the system may identify products by their shape, and instead assumes that all of the products it is measuring are multiple units of the same product, which is the case in most warehouses. A result may be generated that estimates the number of boxes in the warehouse slot, bin, or other storage location where the photodetectors 58 perform a sensing function. This data may be used independently, or in connection, with weight detection values determined by the measurement system of FIGS. 1-4.

The foregoing method steps may include the storing of program code in a computer-readable storage device of the computer system through use of one or more special purpose hardware computer processors. The program code, upon being executed by the processor, implements a method according to embodiments herein. Thus, the present invention discloses a process for supporting, deploying and/or integrating computer infrastructure, integrating, hosting, maintaining, and deploying computer-readable code into one or more computer devices, wherein the code in combination with the computer device is capable of performing a method according to embodiments herein.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that some or all blocks of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for determining an amount of shelf space, comprising:
    a plurality of weight sensors at a region of a shelf that directly measure a force related to a weight of physical items positioned on the shelf and generates a weight result, the shelf positioned at an angle from a horizontal axis; the shelf positioning the physical items at the angle, the weight sensors further detecting a tilt of the shelf;
    a shelf angle determination device that determines the angle of the shelf corresponding to the tilt of the shelf and outputs a shelf angle result; and
    an occupancy determination processor that determines an amount of surface area of the shelf occupied by the physical items from the weight result and the shelf angle result.

2. The system of claim 1, wherein the occupancy determination processor polls all of the weight sensors to determine a percentage of occupancy of the shelf.

3. The system of claim 1, wherein the processor polls the weight sensors for slot weight.

4. The system of claim 1, wherein the weight sensors detect a change in capacitance caused by the weight of the physical items, and wherein the weight sensors include a special-purpose processor that translates the detected changed in capacitance to a value indicative of the force applied to the shelf.

5. The system of claim 4, wherein the force is covered to a total weight value, which is compared to a maximum weight capable of being applied to the shelf.

6. The system of claim 1, wherein the shelf is configured to provide multiple storage spaces for the items, and wherein a location of the items is tracked by a stock keeping unit (SKU) or other identification code associated with each item.

7. The system of claim 6, further comprising a database for storing a SKU slot assignment.

8. The system of claim 1, wherein the shelf angle determination device comprises an inclinometer for measuring a downward angle of the shelf and wherein the downward angle is used for determining the percentage of occupancy of the shelf.

9. The system of claim 1, further comprising an alarm generator that provides warnings and alarms for user directed inventory levels by slot.

10. The system of claim 1, wherein the weight sensors include a pair of capacitive plates, wherein the compression force detected by the weight sensors is measured by an accelerometer to determine the weight.

11. The system of claim 1, wherein the system is constructed and arranged for positioning at a warehouse, and wherein the shelf is an industrial shelf.

12. The system of claim 1, further comprising at least one light sensor at the shelf; and a processor that receives a signal from the at least one light sensor and that contributes to determining the area of the shelf that is occupied with the items in response to the light sensor signal.

13. The system of claim 12, wherein the at least one light sensor is a photodetector product sensor.

14. A method for determining an amount of shelf space, comprising:
    measuring, by a weight sensor, a force related to a weight of physical items positioned on a shelf and generating a weight result, the shelf positioned at an angle from a horizontal axis;

detecting, by the weight sensor, a tilt of the shelf determining the angle of the shelf corresponding to the tilt of the shelf; and determining an amount of surface area of the shelf occupied by the physical items from the weight result and the shelf angle result.

15. The method of claim 14, wherein generating the weight result comprises detecting a compression force applied to a pair of capacitive plates.

16. The method of claim 15, further comprising detecting a change in capacitance caused by the weight of the physical items, and translating the detected change in capacitance to a value indicative of the force applied to the shelf.

17. The method of claim 14, further comprising polling all of the weight sensors at the shelf to determine a percentage of occupancy of the shelf.

18. The method of claim 17, further comprising polling the weight sensors for slot weight.

19. The method of claim 14, wherein the percentage of occupancy of the shelf is determined by both item weight and shelf angle.

20. A system for determining an amount of shelf space, comprising:

a shelf comprising:

a plurality of weight sensors at a region of the shelf that directly measure a force related to a weight of physical items positioned on the shelf and generates a weight result, the shelf positioned at an angle from a horizontal axis; the shelf positioning the physical items at the angle; and a shelf angle determination device that determines the angle of the shelf and outputs a shelf angle result, the system further comprising:

an occupancy determination processor that determines an amount of surface area of the shelf occupied by the physical items from the weight result and the shelf angle result.

* * * * *